(12) United States Patent
Hoertenhuber et al.

(10) Patent No.: US 9,056,365 B2
(45) Date of Patent: Jun. 16, 2015

(54) MONITORING MODULE FOR MONITORING A PROCESS WITH AN ELECTRIC ARC

(75) Inventors: Martin Hoertenhuber, Eberstalzell (AT); Guenther Reinthaler, Taufkirchen/Trattnach (AT)

(73) Assignee: FRONIUS International GmbH, Pettenbach (AT)

( * ) Notice: Subject to any disclaimer, the term of this patent is extended or adjusted under 35 U.S.C. 154(b) by 565 days.

(21) Appl. No.: 13/394,901

(22) PCT Filed: Sep. 13, 2010

(86) PCT No.: PCT/AT2010/000330
§ 371 (c)(1),
(2), (4) Date: May 17, 2012

(87) PCT Pub. No.: WO2011/029118
PCT Pub. Date: Mar. 17, 2011

(65) Prior Publication Data
US 2012/0229632 A1    Sep. 13, 2012

(30) Foreign Application Priority Data
Sep. 11, 2009    (AT) .............................. A 1448/2009

(51) Int. Cl.
*H05K 5/03*    (2006.01)
*B23K 9/095*    (2006.01)

(52) U.S. Cl.
CPC .................................. *B23K 9/0956* (2013.01)

(58) Field of Classification Search
CPC .......... B23K 9/0956; B23K 5/00; B23K 7/00; B23K 9/00; B23K 10/00; B23K 11/00; B23K 13/00; B23K 15/00; B23K 20/00; B23K 9/095; H04N 7/18; H04N 7/181; H04N 7/183; H04N 7/188; G06K 9/00771; G06K 9/00; G08B 13/196; G08B 13/19656
USPC .......................................... 348/143
See application file for complete search history.

(56) References Cited

U.S. PATENT DOCUMENTS 4,348,578 A    9/1982    Masaki
4,471,207 A    9/1984    Hawkes
(Continued)

FOREIGN PATENT DOCUMENTS

CN    201552367 U    8/2010
DE    29 33 216       2/1980
(Continued)

OTHER PUBLICATIONS

International Search Report of PCT/AT2010/000330 dated Jul. 12, 2011.

*Primary Examiner* — Shan Elahi
(74) *Attorney, Agent, or Firm* — Collard & Roe, P.C.

(57) ABSTRACT

A monitoring module for monitoring an electric arc machining process includes a camera, a photo flash lamp and a control system that controls the photo flash lamp in such a way that it illuminates when the camera records the image. The components are arranged in a common housing. The common housing includes a compressed air connection and an air outlet (7) or a deflection device arranged at the housing, which is provided for the orientation of the discharging air beam across the optical axis of the camera. Furthermore, an air flow caused by the compressed air is led via the light source and/or the control system and/or a charging connection for the light source.

22 Claims, 5 Drawing Sheets

(56) References Cited

U.S. PATENT DOCUMENTS

| | | | |
|---|---|---|---|
| 4,595,820 A * | 6/1986 | Richardson | 219/137 PS |
| 4,764,655 A | 8/1988 | Ortiz, Jr. et al. | |
| 4,881,678 A * | 11/1989 | Gaudin | 228/102 |
| 4,918,517 A * | 4/1990 | Burgoon | 348/90 |
| 5,275,327 A | 1/1994 | Watkins et al. | |
| 5,329,089 A * | 7/1994 | McGee et al. | 219/121.45 |
| 5,614,116 A | 3/1997 | Austin et al. | |
| 5,811,055 A * | 9/1998 | Geiger | 266/49 |
| 6,046,431 A | 4/2000 | Beattie | |
| 6,091,048 A * | 7/2000 | Lanouette et al. | 219/130.21 |
| 6,177,649 B1 * | 1/2001 | Juret et al. | 219/121.63 |
| 6,563,085 B2 | 5/2003 | Lanouette et al. | 219/130.5 |
| 7,868,269 B2 * | 1/2011 | Silvestro | 219/133 |
| 8,792,041 B2 * | 7/2014 | Green et al. | 348/335 |
| 2003/0210906 A1 * | 11/2003 | Peterson et al. | 396/427 |
| 2004/0026388 A1 * | 2/2004 | Staufer et al. | 219/121.78 |
| 2004/0026392 A1 * | 2/2004 | Feichtinger et al. | 219/130.5 |
| 2004/0105264 A1 * | 6/2004 | Spero | 362/276 |
| 2005/0127052 A1 * | 6/2005 | Spencer | 219/130.01 |
| 2005/0155959 A1 * | 7/2005 | Bender et al. | 219/133 |
| 2005/0161450 A1 * | 7/2005 | Stava | 219/133 |
| 2006/0027547 A1 * | 2/2006 | Silvestro | 219/133 |
| 2006/0049158 A1 | 3/2006 | Schurmann et al. | |
| 2007/0206942 A1 | 9/2007 | Gyde Heaven et al. | |
| 2007/0210047 A1 * | 9/2007 | Child | 219/124.34 |
| 2008/0310140 A1 | 12/2008 | Capozzi | |
| 2010/0132351 A1 * | 6/2010 | Silvestro | 60/327 |
| 2010/0253826 A1 | 10/2010 | Green et al. | |
| 2010/0326962 A1 * | 12/2010 | Calla et al. | 219/76.14 |

FOREIGN PATENT DOCUMENTS

| | | |
|---|---|---|
| DE | 33 33 151 | 3/1985 |
| DE | 10 2004 039410 | 2/2006 |
| EP | 0 307 236 A1 | 3/1989 |
| EP | 1 769 880 | 4/2007 |
| GB | 2 325 107 | 11/1998 |
| JP | 63-040692 | 2/1988 |
| JP | H01-104475 A | 4/1989 |
| JP | H02-255272 A | 10/1990 |
| JP | 63-04754 | 11/1994 |
| JP | 2003-001418 A | 1/2003 |
| JP | 2006-007303 A | 1/2006 |
| JP | 2009-028775 A | 2/2009 |
| JP | 2009-034731 A | 2/2009 |
| WO | WO 96/13354 | 5/1996 |
| WO | WO 98/22850 | 5/1998 |
| WO | WO 2007/098609 | 9/2007 |
| WO | WO 2009/018391 | 2/2009 |

* cited by examiner

MONITORING MODULE FOR MONITORING A PROCESS WITH AN ELECTRIC ARC

CROSS REFERENCE TO RELATED APPLICATIONS

This application is the National Stage of PCT/AT2010/000330 filed on Sep. 13, 2010 which claims priority under 35 U.S.C. §119 of Austrian Application No. A 1448/2009 filed on Sep. 11, 2009, the disclosure of which is incorporated by reference. The international application under PCT article 21(2) was not published in English.

BACKGROUND OF THE INVENTION

1. Field of the Invention

The invention relates to a monitoring module for monitoring a process with an electric arc, with the electric arc being led with a torch, comprising a camera, a photo flash lamp and a control system that controls the photo flash lamp in such a way that it illuminates when the camera records an image and the said components (camera, photo flash lamp, control system) are arranged in a common housing.

2. The Prior Art

For some time now, processes with an electric arc, such as e.g. welding processes, have been monitored in order to be able to recognize failures as early as possible and to interact in a correcting way if necessary. For this purpose, for example, the welding pool is monitored and also the sound emission during the welding process is evaluated in order to be able draw conclusions concerning the quality of the welding process. Some possibilities have already been known from prior art.

The JP 6304754 A for example shows a device for monitoring a welding pool, which consist of a camera and a stroboscope lamp. The lamp is synchronized with the camera in such a way that it emits light when the camera records a picture (a "frame"). The stroboscope illuminates the environment of the welding place in such a way that the latter has approximately the same brightness as the electric arc of the arc welding apparatus.

Another, similar example is the WO 1996/013354 A1, which also discloses a camera for monitoring and a stroboscope lamp for illuminating the melting bath during the welding process.

The EP 1 769 880 A1 shows furthermore an arrangement consisting of a camera and a flash lamp for monitoring the welding point, the camera and the flash lamp of which are arranged at different positions relative to the welding point and are arranged in different angles to the latter in order to avoid the formation of shadows.

Furthermore, the DE 33 33 151 A1 discloses a device and a method, where sound receivers orientated towards a welding or separation point are arranged and the spectrum of the welding sound is continuously analyzed in a control device. This is analyzed with respect to characteristic values important to certain process parameters and feed into the control device of the feed device. In this case, the gas supply, the dosage of the filler material, the feeding of the electrode and/or the positioning of the gun to the workpiece is controlled. The evaluation is complemented by correlation in terms of time and place of the sound measuring or the spectral values concerning the process parameters, such as current, voltage and positioning.

Additionally, the GB 2325107 A shows a device, where a laser projects a first reference mark onto a workpiece to be welded. A video camera records this first reference mark as well as the surrounding of this reference mark and shows a second reference mark into the image. During the welding process, the welding gun is such adjusted, that the first and the second reference mark coincide.

Additionally, the DE 10 2004 039 410 A1 discloses a method and a device for regulating an automated machining process. In this case, by means of a light source and a first optic arranged between the light source and a workpiece to be machined, a line of light is projected onto a region of the workpiece machined by means of a processing head. Furthermore, the line of light is depicted onto a receiving arrangement by a second optic. By means of an evaluation circuit, at least one machining parameter of a machine tool is regulated depending on the comparison of an actual value of a parameter calculated on the basis of the course of profile and a target value.

Furthermore, the U.S. Pat. No. 4,471,207 discloses a system for electric arc welding, where the process can be monitored by means of a sound which is modulated according to the welding voltage and the welding current. The loudness of the sound is changed corresponding to the welding current and the frequency of the sound is changed according to the welding voltage.

Furthermore, the U.S. Pat. No. 4,764,655 shows a laser-materials processing machine, where a focal spot of a laser beam on a workpiece is watched with the help of a video camera. The diameter of the laser beam is calculated on the basis of the recorded image.

Finally, the WO 2007/098609 A1 shows a camera, the housing of which is featured with a compressed air connection. The fed air is thereby used for the cleaning and the cooling. In order to keep clean the lens of the camera, the compressed air is led through an outlet opening arranged in the camera housing in the region of the lens. Thus, an air flow, which leads away from the lens and is adjusted to the optical axis of the camera is created.

Furthermore, the US 2008/0310140 A1 generally shows a diffuser for a flash lamp of a camera.

Furthermore, the WO 98/22850 discloses a filter arrangement for a camera with a frame, a filter inserted into the frame as well as a fixing ring for fixing the filter in the frame.

Finally, the WO 2009/018391 generally discloses a video camera, where the image plane of an image sensor can be rotated with respect to the housing of the camera.

The disadvantage of the known method is that they are proprietary that means designed for the respective type of machine and the respective purpose of application. Additionally, the solutions are comparably expensive and difficult to service due to their low number of units. Also the restricted accessibility, the increased space requirement and the security against the increased impact of dirt of the process such as smoke or splashes that needs improvement are disadvantageous. For this reason, also the maintenance effort increases.

SUMMARY OF THE INVENTION

The objective of the invention is thus to create a monitoring module for monitoring the result of at least one process of machining with at least one electric arc, in particular one, which essentially forms a unity with a welding torch.

The objective of the invention is provided by a monitoring module as described herein, namely a monitoring module of the kind mentioned at the beginning, the housing of which comprises a compressed air connection and an air outlet or a deflection device, which is provided for the orientation of the exiting air beam perpendicular to the optical axis of the camera that means for producing a so-called crossjet and where an air flow caused by the compressed air is led over the light source and/or the control system and/or the charging connection for the light source.

In this way, a (in a production site mostly present) compressed air supply can be used to keep the optical components free of soot, smoke and deposits, which are caused by a process like the welding process. The monitoring module advantageously also comprises an air filter to be able to avoid impurities in the monitoring module. The air filter particularly causes that the cleaning effect of the protective glasses or coverings are not affected in a negative way by contaminating the coverings with the compressed air.

Due to the fact that electronic and/or electrical components are arranged within the flow path of the air, the compressed air can be used for cooling the electronic and/or electrical components and can thus serve a double purpose in a synergetic way. In particular, a charging connection for the flash lamp can be cooled, which considerably heats due to the high light power required. Of course, also a water cooling circuit can be provided for the cooling of the components mentioned.

According to the invention, a universal monitoring module for the monitoring of the results of a running process of machining with an electric arc—i.e., an online-monitoring—is created this way. Said monitoring module can be used with a number of machine types and purposes of application. Due to the invention, particularly already existent torches can be retrofitted with a monitoring module. Additionally, the camera, the light source and the control system are best protected against harmful environmental influences in the closer surrounding of a processing location and failures of a processing location, with the result that the maintenance effort is advantageously reduced. The housing can in this case be of metal and/or plastics, for example. Due to the securing at the torch or close to the robot flange (fixing device), the result achieved with the electric arc is irrespective of the movements of the torch or the effects of the electric arc on the workpiece, such as the creation process of the welding seam—that means the melting bath, solidifying and finished seam, always in the camera's eye. Furthermore, the supply lines for the monitoring module can essentially be led in a hose assembly for the torch, with the result that the supply lines do not represent restrictions in terms of freedom of movement. At the same time, the camera can be protected against radiation of the electric arc and splashes of the process by at least a part of the torch, for example a gas nozzle.

As a light source, for example a xenon flash lamp, a stroboscope or a high-performance LED can be used, which are appropriately clocked by the control system. The lighting duration is for example in a range of 1 ms, followed by a lighting pause for example in a range of 100 ms. The required high voltage for the flash lamp (ca. 600 VDC) is advantageously produced in an external power supply unit. Using this voltage, the capacitor of the charging connection for the flash lamp is charged. Advantageously, the charging connection with the so-called impulse resistant capacitors is arranged in the direct surrounding of the flash lamp to effect that the partly very high currents (ca. 3000 A caused by essentially a short circuit in case of discharging) do not cause a too high voltage drop on their way or the thick supply lines can be kept short. This way, interferences or other electrical lines in the region of the monitoring module can additionally be avoided, that means that the EMC load of the surrounding of the monitoring module can be kept low. Advantageously, an optical fiber can be used to guide the light of the flash lamp to any place.

For example a CMOS camera or a CCD camera, preferably a digital variant, can be used as a camera. Furthermore, cameras for moving images and/or unmoving images can be considered. It is particularly advantageous if the camera or the monitoring module has a data bus or a USB interface and the image data can thus be transferred by serial data transmission to any place. Of course, the date can be transferred by means of another protocol, the date can particularly be transferred via a fiber optic cable.

In an advantageous variant, an (optical) filter is installed before the camera, which eliminates or at least weakens light of interfering wavelengths of the electric arc. These filters are particularly considered in the event that LEDs are used as a light source. In this case, a bandpass filter is advantageously used, which is adjusted to the wavelength of the LEDs as well as the electric arc. This wavelength substantially ranges between 600 nm and 650 nm.

With the help of the camera, an advancing, subsequent as well as a lateral monitoring of the welding seam, the welding gap, the melting bath and so on is possible. For an uninterrupted monitoring of the welding process, two or more cameras or monitoring modules can be applied at the same time.

In a variant, the images taken of the process with the electric arc, such as a welding process, are transmitted to a control station with an evaluation unit. By means of digital data transmission, an operator can thus optically and visually follow the welding process taking place in an automated welding cell without having to enter the latter. Thereby, the welding process can also be monitored essentially live in case of a very inhospitable welding environment or a restricted possibility to access the welding place. The image information of the welding process can be evaluated by means of mathematical algorithms, with the result that statements with respect to the quality of the welding can be made. Due to real time monitoring, the advantage arises that irregularities and failures can already be recognized during the welding process and thus, after a welding seams is finished, a further treatment or, in case of parts that cannot be reworked, a withdrawal from the production process can be effected.

In a variant of the invention, single recordings are put together to form a total image of the result of the process, as there is for example e welding seam, where diverse values (e.g. width of the seam, current, voltage, etc.) are shown at a certain position and the values were saved and/or calculated according to the single recordings. Recognized failures can also be recorded. In a further variant, a seam detecting and seam tracking system is realized. Thereby, the current welding position is determined via the image information and the height information (distance of the welding torch to the component) is deducted from the voltage-current-signal of the welding current source. Thus, irregularities in the welding process, for example caused by component tolerances or incorrect fixation of the component, can be compensated.

In the event that the monitoring module is connected to a current source for the electric arc e.g., a welding current source, additional information, such as welding current, welding voltage and wire feed, can be included in the evaluation of the welding quality apart from the image information. The evaluation of the welding is on the one hand effected due to the comparison of saved and references defined to be good, on the other hand due to irregularities of nominal values or the exceeding of adjustable threshold values. As a consequence, a real-time-capable process monitoring and the direct intervention in the welding parameters during the welding are allowed in order to be able to counteract recognized irregularities.

In another advantageous variant, the monitoring module is also connected to a robot control, provided that the current source or the torch of the current source is mounted at a robot. In this way, even larger influence can be exerted on a process like the welding process.

It is advantageous if the camera and the light source are orientated in the direction of the electric arc and the orientation is adjusted to the distance between the electric arc and the housing, provided that the optical axis of the camera and the optical axis of the light source are orientated to one another at an angle. In this way, the direct surrounding of the area being worked on can be monitored. It is thereby particularly advantageous if—provided that the optical axes of the camera and the light source are not parallel—the light source and the camera are such orientated that the intersection point of said axes is situated in the region of the area being worked on. In this way, the energy used for the light source can be used particularly well.

It is beneficial if the housing is formed for being fixed at the torch. The result is a particularly compact unit.

It is advantageous if the compressed air is guided in at least one cooling channel and one cleaning channel, with at least one ending of a cleaning channel being embodied as an air outlet. In this way, the compressed air can be specifically guided onto elements to be cooled and is subsequently led outside via a cleaning channel. In this way, the compressed air can be used more specifically. It is for example possible to lead a cooling channel through a socket of the light source.

It is also advantageous if the compressed air connection is connected to the cooling channel and the cooling channel is embodied for supplying the cleaning channel and at least the region around the control system. In this way, the cooling channel provides one cleaning channel but also a region of the control system with air. In this way, the two purposes of the compressed air, as there are cooling and cleaning, can be coordinated in a better way.

It is beneficial if the housing comprises a transparent covering for the camera and the flash lamp. In this way, the mentioned components can be optimally protected against adverse environmental influences near the welding point and the quality of the image capture is maintained.

It is advantageous if the housing comprises a detachable covering for the camera and the light source, which is partly transparent and embodied as an air outlet. In this way, the covering serves a double purpose; it protects the camera and the light source and causes a cleaning at the same time. Due to the fact that the covering is embodied detachable, it can be easily exchanged.

It is in this case beneficial if the transparent covering is made of plastics. In this way, the covering can be produced cost-efficiently and is thus also applicable to be an expendable or wearing part. By exchanging the transparent covering, optimal conditions for camera and light source can always be created. The exchange is effected from the outside in an easy way, so that it is not necessary to open the housing.

It is particularly advantageous if the transparent covering is provided with a diffuser for the light source. A diffuser can avoid or at least reduce the formation of harsh shadows, which are caused without any further measures, in particular when a flash lamp is used. In case that the transparent covering is produced as an injection molding part, it is easy to produce said diffuser.

It is also advantageous if a microphone is additionally arranged within the monitoring module or within the housing. With the help of the microphone, a process of machining, such as the welding process, can be monitored acoustically. If anomalies are recognized from the sound emitting from the welding point, alert can be trigger or the parameters of the welding process can be adjusted.

It is thereby also beneficial if the microphone is essentially oriented in the direction of the electrical arc—like the camera. In this way it can be ensured that the sounds in the environment do not have a too big influence on the evaluation of the welding sound. In particular, also directional microphones can be used for this purpose.

It is advantageous, if the control system comprises an input for a signal from a current source for the electric arc and the process of image capturing can be controlled by this signal. In this way, information of the current source or information, which can be obtained from the current for the electric arc, can be made usage of for the process of image capturing. The process of image capturing can be harmonized with the machining process in a particularly good way.

It is thereby advantageous if the control system is provided for stopping the process of image capturing, if said current source signalizes an interruption or the termination of the machining process. It is in this way avoided that an image memory—if available—is not filled with useless data. Otherwise, for example in the event of a defective machine, an unchanged welding point would be recorded for a long time.

It is advantageous if the control system comprises an input for the signal of a current source for the electric arc and the power of the light source can be controlled by this signal. In this way, information of the current source of information, which can be obtained from the current for the electric arc, can be made usage of for the controlling of the light source. The power of the light source can thus be harmonized with the machining process in a particularly good manner.

It is thereby particularly advantageous if the control system is provided for reducing the power of the light source, in case the said current source signalizes a short circuit at the place worked on or a strong decrease of processing current. Due to the fact that, in the event of a short circuit, no electric arc exits, which outshines the image, or in the event of decreasing welding current only a low influence is caused by the latter, an image with a reduced light power of the flash lamp can be captured. The light power required depends in this case essentially on the intensity of the ambient light or the light of the glowing melting bath, as well on the required shutter speed or exposure time.

It is of advantage if the monitoring module:
comprises a light-sensitive sensor being essentially orientated towards the electric arc, and
the control system comprises an input for the signal of the light-sensitive sensor with the result that the power of the light source can be controlled depending on the signal of the light-sensitive sensor.

Instead of the input from the welding current source or additionally thereto, a light-sensitive sensor, which is connected to the control system, can be provided for the same purpose. Instead of obtaining information from the current source or from the current for the electric arc, the light emitting from the electric arc is measured for controlling the light source. The power of the light source can thus be harmonized with the machining process in a good manner, too.

It is in this case advantageous if the control system is provided for the reduction of the power of the light source, if the light-sensitive sensor recognizes a weak ambient light. The control system then reduces the power of the flash lamp if the light-sensitive sensor recognizes weak ambient light. This means for example that, in particular if the electric arc expires due to a short circuit or when the welding process is finished or glows low in the event that the welding current is reduced, the light source glows less brightly.

It is furthermore of advantage if the control system comprises an input for a signal from a current source for the electric arc and the beginning of the process of image capturing can be controlled by this signal. In this way, information of the current source or information that can be obtained from the current for the electric arc can be made use of for the beginning of the process of image capturing. The process of image capturing can thus be harmonized with the machining process in a particularly good manner as well.

It is also advantageous if the process of image capturing is only carried out if for example, the welding current source signalizes a short circuit at the welding point or a strong decrease of the welding current or the light-sensitive sensor recognizes weak ambient light. There are welding methods, the electronic arc of which does not always glow with the same intensity e.g., impulse welding, the welding current of which is switched between a basic value (ca. 30 A) and a peak value (ca. 400 A) or even collapses periodically. In case of this variant of the invention, the process of image capturing is triggered, when the electric arc does not glow or only glows slightly. In this way, the required light power of the flash lamp can be reduced considerably. Alternatively or additionally to the input for the welding current source, also a light-sensitive sensor can be provided for the same purpose. This also recognizes if the electric arc glows only weak or does not glow and can signalize it to the control system, which synchronizes the process of image capturing according to the pauses of the electric arc.

It is beneficial if the monitoring module according to the invention is mounted at a torch for performing a process with an electric arc (with the electric arc being protected in particular by a protective gas from a gas nozzle). The advantage of the monitoring module according to the invention come out especially here, because the electric arc glows extremely brightly and an image capturing without a flash lamp would only show the very next environment of the electric arc. Nevertheless, the device according to the invention is also applicable for other machining methods with an electric arc, for example for the welding, soldering, cutting, cleaning. Laser welding, laser-hybrid-welding, plasma processes and others. This means that the monitoring module can be used for various applications, because its image capturing is essentially independent from the ambient light. Advantageously, the monitoring module is mounted to a fixed point relatively to the gas nozzle, with the result that the latter represents a fixed point of reference. Other advantages can be taken from the descriptions above.

It is also advantageous if the torch comprises a gas nozzle and the monitoring module is arranged at the torch in such a way that the gas nozzle at least partially covers an electric during the image capturing, seen in the direction of the optical axis of the camera. In this way, the adverse influence of the electric arc disturbing the quality of the image can be eliminated, at least partially, if not entirely.

Advantageously, the monitoring module is mounted at the torch at a distance of approximately 20 to 30 cm from the electric arc or the ending of the wire. Due to the relatively large distance, the tube bend of the torch can be kept freely accessible, which does not have a negative effect on the exchange of the bearing parts, such as gas nozzle or contact tube. Thus, a good accessibility for the respective applications is maintained. Furthermore, a splash protection as well as a radiation protection is provided. Due to the radiation protection, the power of the light source can be reduced, too, if necessary.

According to the invention, advantageously a covering for the at least one opening of a monitoring module is provided, with the covering being made of a circular frontpane with a concentric, cylindrical fixing surface and the cylindrical fixing surface having a smaller diameter than the frontpane and an air outlet or at least one deflection device, which is provided for orientating the discharging air beam Perpendicular to the optical axis of a camera of a monitoring module, being integrated in the frontpane. This form of covering is, on the one hand, easy to produce, and on the other hand, easy to mount. Due to the integration of an air outlet, it serves a double purpose additionally.

It is thereby advantageous if the at least one deflection device is arranged outside of an annular ring of the frontpane. In this way, the exiting air flow can be aligned perpendicular to the optical axis of the camera and/or the light source, or essentially parallel to the outer surface of the covering. In this way, the outer surface can be protected against impurities in an optimal manner.

It is finally advantageous if at least one fixing device is arranged at least at the barrel of the cylindrical fixing surface. In this way, the covering can be fixed at the housing with the result that it cannot drop out accidentally.

The above embodiments and further embodiments of the invention can be combined in any way.

BRIEF DESCRIPTION OF THE DRAWINGS

For a better understanding of the invention the latter is explained in more detail with reference to the following figures.

The heavily simplified schematics show.

DETAILED DESCRIPTION OF THE PREFERRED EMBODIMENTS

It must first be stated that in the various embodiments described, identical parts have been marked with the same reference identifiers and the same parts descriptions. It is therefore possible to transfer the disclosures contained in the overall description to the identical parts with the same reference identifiers or the same parts descriptions. The selected positioning terms are used in the description, such as top, bottom, side etc., which refer directly to the described and the depicted figures and which can be correspondingly transferred to the new position in the event of a change in position. Furthermore, individual characteristics or combinations of characteristics from the various embodiments shown and described can present independent or inventive solutions, or solutions according to the present invention.

The exemplary embodiments refer to possible variants of embodiment of the monitoring module according to the invention are not intended to limit the scope of the invention to these illustrated variants of embodiments provided herein but that there are also various combinations among the variants of the embodiments themselves and variations regarding the present invention should be executed by a person skilled in the art. All and every imaginable variants of the embodiment, arising from combining single details of the variant of embodiment illustrated and described are subject to scope of protection.

The description of the following FIGS. 1 to 6 is to be read in synopsis.

Figure 1:
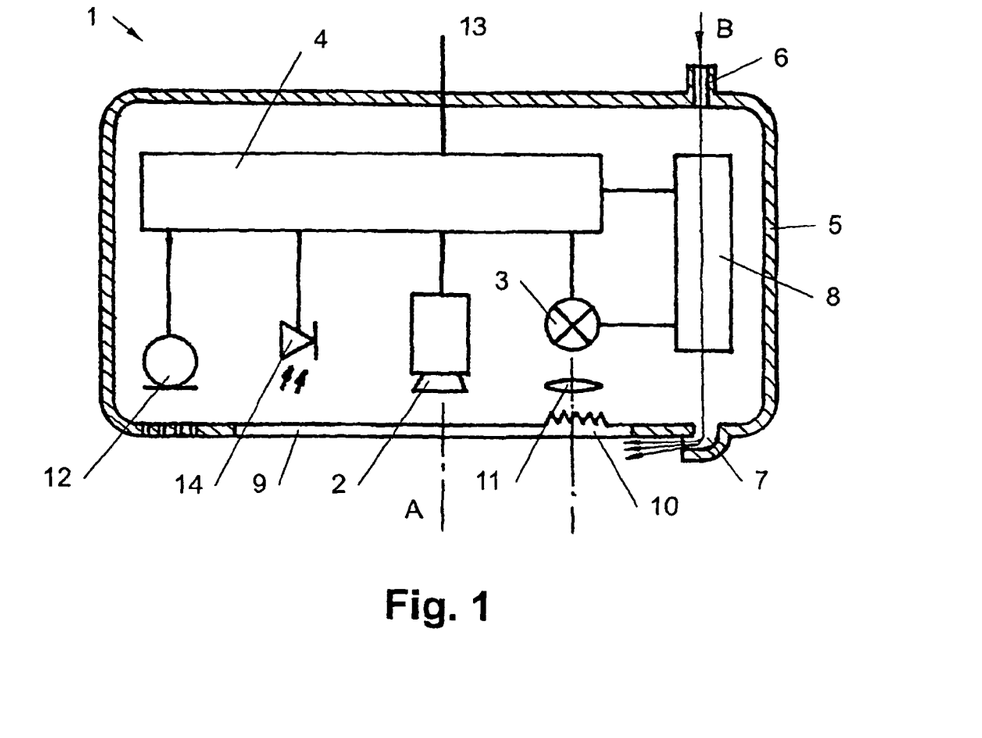
FIG. 1 a first schematically shown monitoring module.

FIG. 1 schematically shows a monitoring module 1 for monitoring at least one machining process with at least one electric arc produced in a torch, comprising a camera 2, a light source 3 and a control system 4, which controls the light source 3 in such a way that it illuminates when the camera 2 records an image. According to the invention, the said components 2, 3, 4 are arranged in a common housing. The housing comprises a compressed air connection 6 and at least one air outlet 7, which is particularly orientated perpendicular to the optical axis A of the camera 2.

Between the compressed air connection 6 and the at least one air outlet 7, a cooling in the interior of the housing is effected by means of the flow of the air in the course of flow B. In particular the light source 3 and the electronic and/or electric components e.g., the charging connection 8 for the light source 3 (e.g. a flash lamp) are cooled. Naturally, also a better cooling of the control system 4 and of the light source 3 can be provided if the course of flow B is led directly over the said components by means of appropriate channels. Furthermore, the housing 5 comprises a transparent covering 9 (here: made of plastics) for the camera 2 and the light source 3. The covering 9 is preferably made of plastics and additionally a diffuser 10 for the light source 3 can be integrated in the covering 9. The usage of a diffuser 10 thereby depends on the kind of the light source 3. I.e. if there is for example a flash lamp provided to be the light source 3, a diffuser is normally required, whereas in case of providing a surface transmitter formed from LEDs as a light source 3, no diffuser is normally required. When a diffuser is used, the latter is preferably arranged at the interior surface of the covering 9, as shown. Also a lens 11 for focusing the light of the light source 3 can be built into the housing 5. In the housing 5, additionally a microphone 12 can be arranged, which is essentially orientated in the direction of the electric arc or the area worked on, like the camera 2. For this purpose, sound input openings are provided in the housing 5. Additionally, the control system 4 comprises an input 13 for a signal from the current source, which is provided for the production of an electric arc, as well as a light-sensitive sensor 14, which is essentially aligned in the direction of the electric arc or the area worked on, like the camera 2.

The function of the arrangement shown in FIG. 1 is the following:

With the help of the camera 2, which looks through a transparent covering 9, for example the welding point (not shown here) can be monitored. As known, an electric arc used with welding and the direct surrounding of it are extremely bright. In contrast to this, the areas further away are relatively dark. These high contrasts overcharge standard cameras to a large extent, because their dynamic range is some apertures stops too small than it was required for the contrast existing in the case of welding. Due to this reason, the welding point is additionally illuminated by means of a light source 3, the light of which is concentrated to the welding point or the region of the electric arc by means of a lens 11 (or another complex optical system, too). In order to avoid harsh shadows caused by the flash lamp, a diffuser 10 diverging the emitted light is built in, particularly if a flash lamp is provided as a light source 3 in the transparent covering 9.

With the help of the light source 3, the environment of the welding point can be illuminated in such a way, that the camera 2 records all details that are relevant for the monitoring of the welding point. Thereby, the light source 3 is with the help of the control system 4 controlled in a way that it illuminates when the camera 2 records an image. For this purpose, the camera 2 is connected to the control system 4 appropriately. The light source 2 can illuminate during the entire exposure time of the camera 2, but also for a smaller period, in particular at the beginning (1. shutter curtain) or at the end (2. shutter curtain) of the exposure time. In this example it is assumed that the light source 2 is a flash lamp. In this example, the control system 4 does not control the flash lamp directly, but via a charging connection 8, that is made of components of the power electronics and, during the illumination interruptions, charges one or several capacitors in a manner known per se, which are discharged when the light source 3 provided as flash lamp 3 is turned on. The arrangement of the control system 4 and the charging connection 8 is to be considered as exemplary. Of course, the control system 4 and the charging connection 8 can also be a part of the camera 2. In principle, the controlling of the light source 3 is effected dependent on the point of time of the image capturing of the camera 2.

Due to the high light powers that are required for illuminating the welding point, the charging connection 8 heats considerably. Due to this reason, the monitoring module 1 has a compressed air connection 6, which is used to lead compressed air above the charging connection 8 (and preferably also above the control system 4) for cooling. This compressed air is usually available in the production area anyway. The exhaust air is led out via an opening, which represents an air outlet 7. The air outlet 7 is in this case aligned in such a way that the discharging air beam intersects the optical axis A of the camera 2, thus keeping the optical components, in the concrete example shown the transparent covering 9, free of soot and deposits. The air outlet 7 is preferably aligned essentially perpendicular to the optical axis A of the camera 2, or essentially parallel to the transparent covering 9.

In the example shown, the monitoring module 1, specifically the control system 4, comprises an input for a signal from a (welding) current source and/or a robot control. The control system 4 stops the process of image capturing if the current source and/or the robot control signal an interruption or the termination of the machining process. Thus, the control system 4 controls the process of image capturing.

Alternatively or additionally, the power of the light source 3 is reduced, if the current source of the electric arc signals a short circuit at the area worked on or a strong decreasing of the welding current. Due to the fact that in the event of a short circuit no electric arc would exist, which outshines the image, an image with reduced light power can be taken. In this case, the necessary light power essentially depends on the intensity of the ambient light and the light of the glowing metal as well on the desired shutter speed and exposure time. Thus, the control system 4 controls the power of the light source 3. You can say, that the control system 4 effects a control of the light source 3 or the image capturing depends on the welding process, with the result that the conditions of the light source 3 of the image capturing are adjusted to the welding process. It is also possible that the welding device or the current source influences or controls the light source 3 or the image capturing by transmitting welding parameters, which are evaluated for image capturing and controlling the light source 3 within the monitoring module 1.

Instead of the input 13 or in addition thereto, for the same purpose a light-sensitive sensor 14 can be provided, which is essentially adjusted in the same way as the camera 2 and which is connected with the control system 4. The control system 4 reduces the power of the flash lamp when the light-sensitive sensor recognizes weak ambient light, this means, in particular in the event that the electric arc extinguishes due to a short circuit or at the end of the welding process. Accordingly, the control system 4 controls the power of the light source 3.

Finally, the control system 4 can be constructed in such a way that a process of capturing an image is only performed if the (welding) current source signals a short circuit at the place worked on or a strong reduction of the current and/or the light-sensitive sensor 14 recognizes weak ambient light. Thus, the control system 4 controls the beginning of the process of capturing an image with the signal. There are, for example, welding methods, the electric arcs of which do not always glow with the same intensity, for example in case of pulsed welding, where the welding current is switched between a basic value (ca. 30 A) and a peak value (ca. 400 A) or even collapses periodically. Another example is the CMT welding (cold metal transfer). In case of this variant of the invention, the process of capturing an image is triggered if the electric arc does not glow or glows only weakly. In this way, the necessary light power of the light source 3 can be considerably reduced. Alternatively of or in addition to the input 13, in this case, the light-sensitive sensor 14 can be provided for the same purpose. This also recognizes if the electric arc does not glow or glows only weakly and can signal this to the control system, which synchronizes the process of capturing an image according to the pauses of the electric arc.

Finally, the control system 4 captures also the signal of the microphone 12 in order to be able to draw conclusions regarding the quality of the welding process and to report an error of the welding process or influence the error, if necessary. Finally, also the microphone 12 e.g., can be used to control the process of capturing an image, similar to the light-sensitive sensor 14.

Thus, the online-monitoring of a process with an electric arc, as in case of the described welding process, can be performed with the monitoring module. This means that the regular pictures of the image capture are transmitted via the data bus to the evaluating unit, which essentially delivers a film made from the delivered images. Due to the high quality pictures, the welding process can be watched in a very realistic way or monitored from a distance.

FIG. 1 shows a monitoring module 1, which combines comparably many features according to the invention. Of course, also a simplified variant of the monitoring module 1 can be used. For example the microphone 12 and/or the light-sensitive sensor 14 can be dropped. It is also not necessary to guide a beam of compressed air through the housing 5. The air beam can—even if it is of advantage—be dropped or can e.g. be created by a blower (not shown) arranged in the housing 5. The expert can in this case effortlessly select the necessary components and adjust the invention to his/her needs without having to act in an inventive way.

Figure 2:
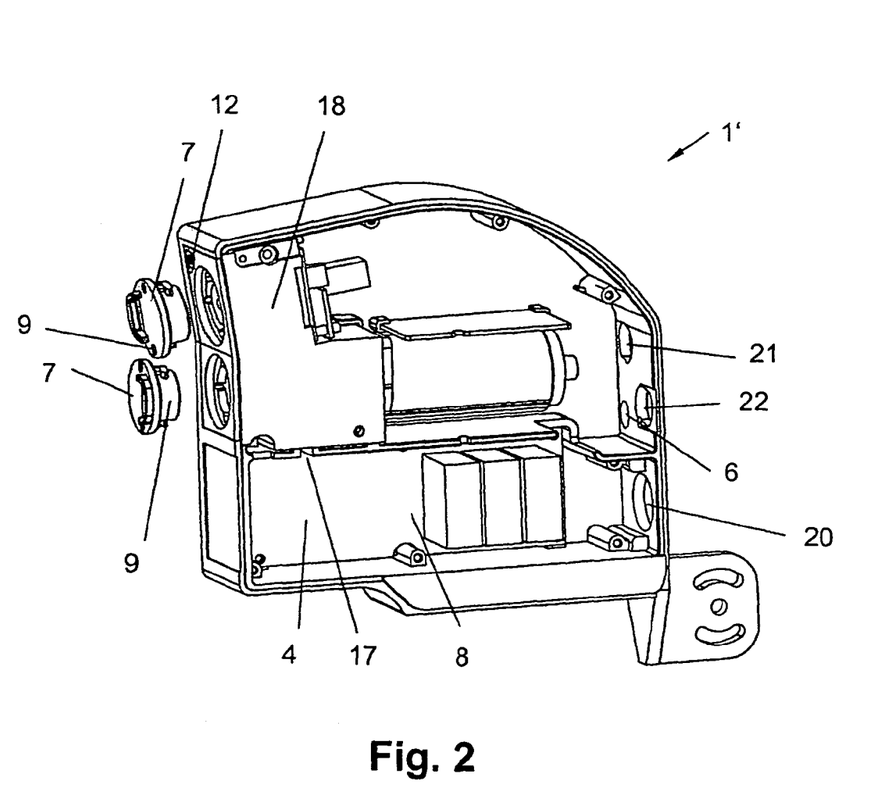
FIG. 2 a three-dimensional view of a concretely processed monitoring module with open housing.
Figure 3:
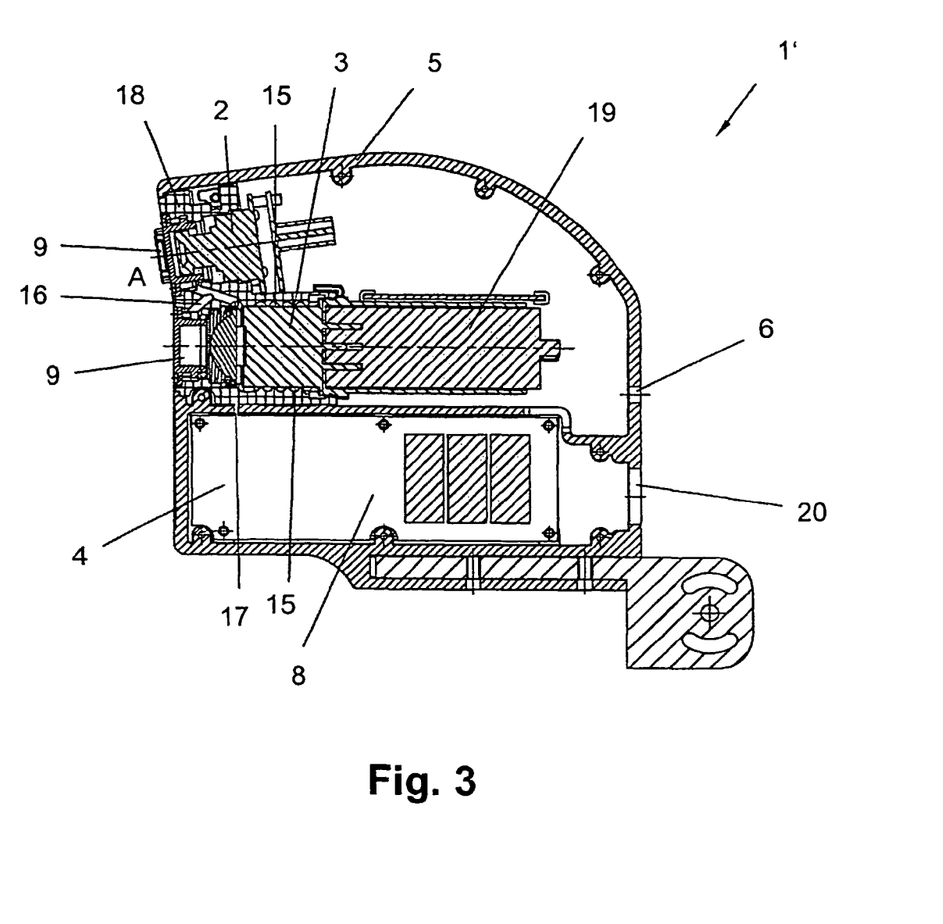
FIG. 3 a sectional view through the concretely processed monitoring module.

FIGS. 2 and 3 show a concrete designed monitoring module 1' in perspective view with opened housing 5 or in sectional view with said monitoring module 1' comprising a camera 2 and a flash lamp as light source 3 in a common housing 5. Accordingly, preferably one respective opening is integrated into a front wall of the housing 5 for the camera 2 and the flash lamp 3, so that a view in the direction of the electric arc is possible. Similarly, the control system 4 of the camera 2 is in this example combined with a charging connection 8 and integrated into the housing 5. One can easily recognize that the optical axis A of the camera 2 and the optical axis of the flash lamp 3 are not orientated parallel but at an angle towards each other in this variant. For example the welding point to be monitored is ideally situated within the intersection point of the two axes or at least near it. The angle of the axes towards each other is accordingly chosen depending on the distance between the welding point and the monitoring module 1'. The distance is thereby mainly defined by the torch 26 required for the application. This is because the monitoring module 1' is preferably secured to the body of the torch so that the accessibility for an elbow pipe 27 of the torch 26 is maintained (compare FIGS. 5 and 6). Similarly, it can simply and, if necessary, also be exchanged in an automated manner. Furthermore, also a protection against so-called weld spatters during a welding process automatically results from the distance to the electric arc.

The guiding of the compressed air is advantageously adjusted in such a way that the exhaust air circulates before the discharge from the housing 5. For the cooling of the charging connection 8 and the control unit 4, accordingly, no high pressure or flow rate of the air is required, so that a splitting according to the cooling connection 17 is sufficient. On the contrast, for cleaning the covering 9, a higher pressure or flow rate of the air is required. Thus, the cleaning channels 16 are arranged in the course of the cooling channel 15, with the result that the discharging air beam essentially crosses the optical axis A of the camera 2 without loss of pressure or flow rate, thus keeping the optical components, in the concrete example shown the transparent coverings 9, clean from soot and deposits. In this case, the air outlet 7 is preferably adjusted essentially perpendicular to the optical axis A of the camera 2 or essentially parallel to the transparent coverings 9.

When a flash lamp is used as a light source 3, it is normally required to be cooled. For this purpose, the compressed air inserted via the compressed air connection 6 is led into at least one cooling channel 15 and at least one cleaning channel 16. Preferably, the compressed air connection 6 is connected with the cooling channel 15, which is at first led spirally around the flash lamp 3. At its end, the spiral cooling channel 15 is split up to be at least one cooling connection 17 for the charging connection 8 as well as for the control system 4 and to be the cleaning channel 16. The cleaning channel 16 correspondingly leads the compressed air to the coverings 9, where an air outlet is incorporated. In case of this embodiment, the air outlet 7 for the camera 2 and for the light source 3 is separated, with the outlet directions preferably being adjusted into opposite directions. The respective air outlet 7 is in this case arranged in such a way, that the compressed air essentially discharges across the axis of the camera 2 or the light source 3. Additionally, the air outlet 7 can be embodied in such a way (for example raised) that the coverings 9 can be changed from the outside, preferably with the help of a tool, and without opening the housing 5.

The compressed air is essentially led into the closed area for the charging connection 8 or the control system 4 via the cooling connection 17, with the compressed air in the region of the connecting cables between light source 3 and charging connection 8 flowing again into the area for the camera 2 and the light source 3. Furthermore, an opening also representing an air outlet 7 is integrated into the housing in the area of the camera 2. It is thus ensured that the compressed air circulates within the housing 5 with the result that an effective cooling is achieved.

The spiral cooling channel 15 is e.g. integrated into a body 18, which is simultaneously embodied for retaining and securing the flash lamp 3 and the camera 2. Accordingly, also the cleaning channels 16 and the cooling connection 17 are integrated into this body 18. Additionally, also a lamp socket 19 of the flash lamp 3 can be cooled. The compressed air is e.g. diverged from the cooling connection 17 integrated into the body 18. Basically, a flow rate of the compressed air in a range 25 l/min and more per monitoring module or flash lamp 3 is required.

The coverings 9 are preferably embodied in different ways, with the result that the covering 9 with the diffuser 10 has always to be positioned at the flash lamp 3. Similarly, a twist protection is integrated, with the result that the correct direction of discharge is adjusted. Thus, the two air outlets 7 do not interfere with each other. It is furthermore avoided that the discharging air flows over the microphone, as the case may be. The coverings 9 are furthermore formed from a circular front screen and a fixing cylinder, the center of which is the same. The cylinder for fixing has in this case a smaller diameter than the front screen, with the result that there is an annular ring around the cylinder for fixing. In the concrete case, the air outlet 7 is arranged in the region of the annular ring, with the result that the air outlet 7 does not negatively affect the view of the camera 2 or the flash lamp 3—which is effected from the interior of the fixing cylinder and through the front screen. The air outlet 7 is in this case designed as a deflection device, with the result that the compressed air flows over the front screen and cleans the latter. The coverings 9 are furthermore accordingly fixed in the openings of the end wall of the housing 5 via the cylinder for fixing, due to the fact that at least at the outer lateral surface of the cylinder for fixing at least one fixing device is arranged. This is e.g. designed as a bayonet.

The compressed air can of course also be diverged from a feed line for the torch, with the result that lines at the hose assembly can accordingly be saved. The flow direction and the flow volume of the compressed air can in this case be adjusted via a valve of the control system 4 and/or the current source.

The housing 5 additionally comprises an opening 20 for a power supply cable, an opening 21 for a video cable and an opening 22 for an audio cable.

Figure 4:
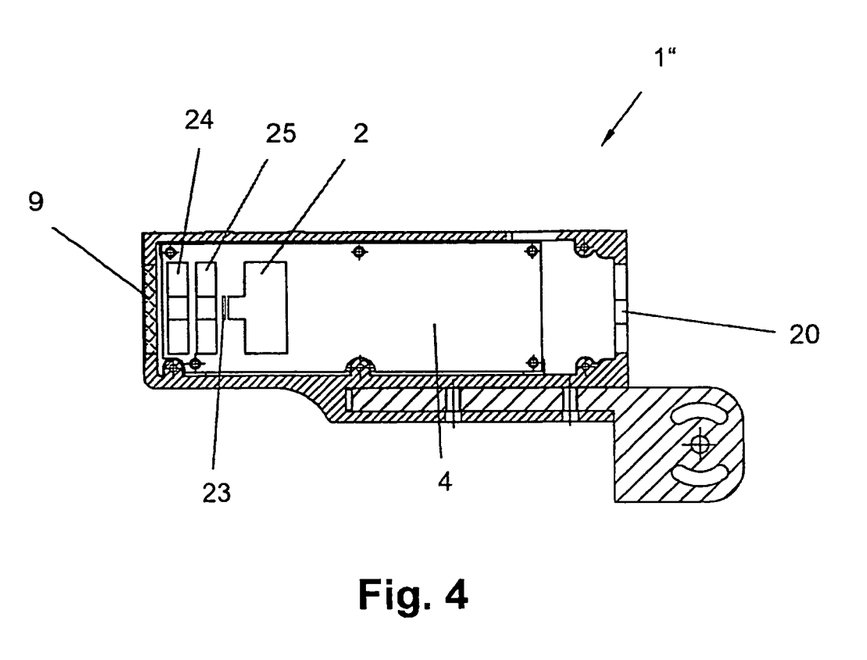
FIG. 4 a sectional view through another concrete processed monitoring module.

FIG. 4 shows another variant of the monitoring device 1" according to the invention, where LEDs are provided to be the light source 3. When at least one LED is used as a light source 3, the cooling can essentially be omitted. Similarly, no diffuser is required, because when several LEDs, e.g. in the form of a so-called LED array 24, i.e. a surface emitting diode, are implemented, the diffuse light source 3 is automatically enlarged. The capturing of an image by means of the monitoring module 1' as per FIG. 4 can in this case be optimized in such a way that the individual LEDs or several LEDs together can be controlled in different ways. As a result, the shading effect can essentially be influenced. Generally, the focusing of the LEDs is adjusted to the focus of the camera and the distance between the camera 2 and the electric arc. For focusing the light of the LED, also a reflector 25 can be used, with the result that the light is focused to the place worked on. Furthermore, LEDs require a considerably smaller charging connection, with the result that the space requirement of the housing 5 can be reduced considerably. LEDs can e.g. be arranged around the camera 2. Accordingly, the reflector 25 and the LEDs are protected by means of a covering 9 (e.g. of glass), which can also be provided with a cleaning channel 16 or an air outlet 7.

The image capturing can nevertheless be improved by the usage of filters 23, reducing the disturbing influence of the electric arc. The filter 23 is arranged in front of the camera 2 and thus effects that only light having a certain wave length in a range between 600 nm and 700 nm can pass. Accordingly, the light source 3 is adjusted to the filter 23. Thus, an extended exposure time of the camera 2 is achieved without causing an overexposure.

Figure 5:
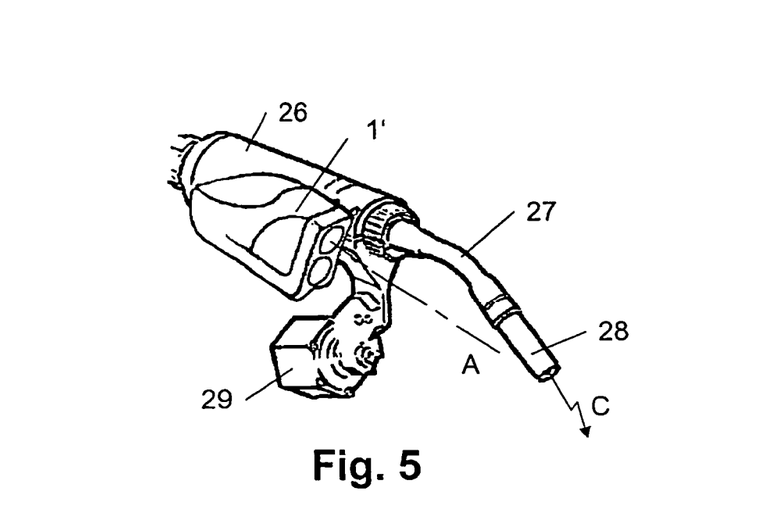
FIG. 5 the arrangement of the monitoring module according to the invention at a welding torch.

FIG. 5 shows now an example for a way of arrangement of the monitoring module 1' at a welding torch 26. This can accordingly be transferred to a cutting torch, to a plasma torch a torch for purification processes, and to other similar setups. The welding torch 26 thereby comprises an elbow pipe 27, a gas nozzle 28 as well as a fixing device 29. The two circular openings in the housing of the monitoring module 1' for the camera 2 and the light source 3 (not shown) are clearly recognizable. The monitoring module 1' is in this example arranged at the welding torch 26 in such a way, that essentially a unity is created and an electric arc C, viewed in the direction of the optical axis A of the camera 2, is at least partially covered by the gas nozzle 28. In this way, the disturbing influence of the electric arc negatively affecting the quality of the image can additionally be reduced. This also means that the gas nozzle 28 is always visible on the image delivered to the evaluation unit via the data bus. This will occur in the event of a leading monitoring, a trailing monitoring and/or a lateral monitoring of the welding point.

Several monitoring modules 1' can also be fixed to the torch 26, or several cameras 2 can be arranged in one monitoring module 1'. Due to this reason, several hubs can be integrated into the monitoring module 1' with the result that the number of supply lines or bus lines is minimized. Due to this online monitoring (i.e. when the electric arc C is active or glows) of the welding process, the quality of the welding process can directly be evaluated. In this case, quality primarily refers to the welding result, so that it is essentially not required to capture the electric arc C on the image. In the event of a delayed monitoring, for this purpose, the monitoring module 1' is secured to the torch 26 in such a way that the running welding process with the melting bath is at least partially visible at one edge of the image and the remaining image shows the welding bead as welding result of the already-performed welding process. The quality of the image is accordingly improved also due to the extremely short shutter speed in the range of 1 ms, because in this manner interferences by the electric arc itself, other light sources, or probably also the daylight do not have any influence.

Figure 6:
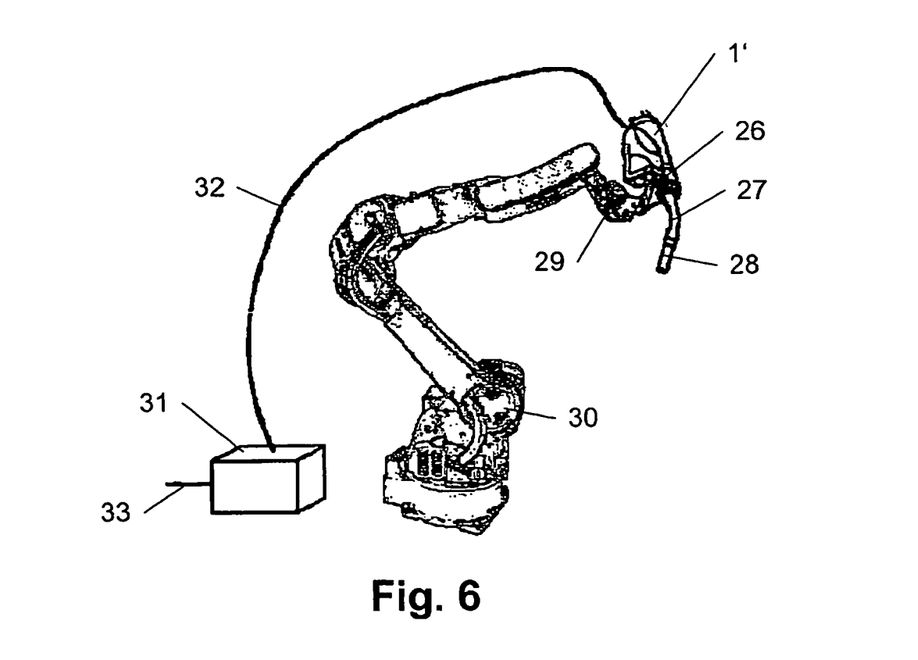
FIG. 6 the arrangement of the monitoring module according to the invention at an industrial robot.

FIG. 6 finally shows an industrial robot 30, to the arm of which a welding torch 26 with a monitoring module 1' is secured with the help of the fixing device 29. It is of course not absolutely required that the monitoring module 1' is secured to the welding torch 26, but it can also be secured to the industrial robot 30. In FIG. 6 is additionally shown an energy supply 31, conducting the electrical energy 20 (in this case: 600 VDC) to the monitoring module 1' via a supply cable 32. In the example shown, also the data line or the bus line/data bus for the video or audio date, or the USB and/or Ethernet data line are situated within the supply cable 32. A mains cable 33 finally creates the connection to the grid (e.g. 230 VAC). In the example shown, also the data line for the video and/or audio date is passed within the mains cable 33. With the help of this data line, the data can e.g. be transmitted to a remote PC, where they can be displayed or processed. The supply cable 32 can of course also be led between the torch 26 and a current source (not shown) within a hose assembly. The hose assembly is e.g. at least partially passed within the arms of the robot, as adumbrated. It is thus possible, that the energy supply 31 is performed by the current source of the electric arc or is integrated therein. As a matter of form, it is finally noted that in order to facilitate an enhanced understanding of the design of monitoring module 1, 1' or its component parts, these are illustrated in part not to scale and/or enlarged and/or reduced in size.

The fundamental function of the independent inventive solutions can be taken from the description.

Finally, the individual features illustrated in the embodiments shown in the FIGS. 1 to 6 may be construed as independent solutions proposed by the invention in their own right. The associated objectives and solutions proposed by the invention may be found in the detailed descriptions of the drawings.

LIST OF REFERENCE NUMERALS 1, 1', 1" Monitoring module
2 Camera
3 Photo flash lamp (Light source)
4 Control system
5 Housing
6 Compressed air connection
7 Air outlet
8 Charging circuit/connection
9 Covering
10 Diffuser
11 Lens
12 Microphone
13 Input for light source for electric arc
14 Light-sensitive sensor
15 Cooling channel
16 Cleaning channel
17 Cooling connection
18 Body
19 Lamp socket
20 Opening for power supply cable
21 Opening for video cable
22 Opening for audio cable
23 Filter
24 LED arrays
25 Reflector
26 (Welding) Torch
27 Tube bend
28 Gas nozzle
29 Fixing device
30 Industrial robot
31 Energy supply
32 Supply cable
33 Mains cable
A Optical axis of the camera
B Flow path of the air
C Electric arc

The invention claimed is:

1. Monitoring module for monitoring a process with an electric arc, with the electric arc being led with a torch, the monitoring module comprising:
a camera,
a light source,
a control system which controls the light source in such a way that it illuminates when the camera records the image and
a common housing, where at least the camera, the light source, and the control system are arranged in the common housing, wherein
the common housing comprises a compressed air connection and an air outlet or a deflection device arranged at the common housing that is provided for the orientation of the discharging air beam across the optical axis of the camera, and
an air flow caused by the compressed air that is led via the light source and/or the control system and/or a charging connection for the light source and the common housing comprises a detachable covering for the camera, the detachable covering being at least partially transparent.

2. Monitoring module according to claim 1, wherein the camera and the light source are oriented in the direction of the electric arc and their orientation is adjusted to the distance between the electric arc and the common housing, provided that the optical axis of the camera and the optical axis of the light source are arranged transverse to each other.

3. Monitoring module according to claim 1, wherein the common housing is embodied to be secured to the torch.

4. Monitoring module according to claim 1, wherein the compressed air is led at least in one cooling channel and a cleaning channel, and at least one ending of a cleaning channel is embodied as an air outlet.

5. Monitoring module according to claim 1, wherein the compressed air connection is connected with a cooling channel and the cooling channel is embodied for feeding a cleaning channel and at least the region around the control system.

6. Monitoring module according to claim 1, wherein the common housing comprises a detachable covering for the light source, which is at least partially transparent and embodied as an air outlet.

7. Monitoring module according to claim 6, wherein the covering is made of plastics.

8. Monitoring module according to claim 6, wherein a diffuser is integrated into the covering for the light source.

9. Monitoring module according to claim 1, wherein a microphone is additionally arranged in the common housing.

10. Monitoring module according to claim 1, wherein the control system comprises an input for a signal from a current source for the electric arc and the process of capturing an image can be controlled.

11. Monitoring module according to claim 10, wherein the control system is provided for stopping the process of capturing an image in case the said current source signals an interruption or the termination of the machining process.

12. Monitoring module according to claim 1, wherein the control system comprises an input for a signal from a current source for the electric arc and the power of the light source can be controlled by this signal.

13. Monitoring module according to claim 12, wherein the control system is provided for the reduction of the power of the light source in case the said current source signals a short circuit at the place worked on or a strong reduction of the processing current.

14. Monitoring module according to claim 1, wherein the monitoring module comprises a light-sensitive sensor, which is essentially orientated towards the electric arc, and the control system comprises an input for the signal of the light-sensitive sensor, with the result that the power of the light source can be controlled depending on a signal of the light-sensitive sensor.

15. Monitoring module according to claim 14, wherein the control system is provided for the reduction of the power of the light source in case the light-sensitive sensor signals weak ambient light.

16. Monitoring module according to claim 1, wherein the control system comprises an input for a signal from a current source for the electric arc and the beginning of the process of capturing an image can be controlled by the signal.

17. Monitoring module according to claim 16, wherein the control system is arranged in such a way that a process of capturing an image is only performed if the current source for the electric arc signals a short circuit at the processing area or a strong reduction of the processing current or the light-sensitive sensor recognizes weak ambient light.

18. Torch for performing a process with an electric arc, which is protected with a protective gas from a gas nozzle, wherein a monitoring module according to claim 1 is secured to the torch.

19. Torch according to claim 18, wherein the electric arc is during the image capturing at least partially covered by the gas nozzle due to the fixing.

20. Covering for at least one opening of a monitoring module, wherein
- the covering is made of a circular frontpane with a concentric, cylindrical fixing surface, with the cylindrical fixing surface having a smaller diameter than the frontpane and
- an air outlet or at least one deflection device is integrated into the frontpane, which is provided for the orientation of the discharging air beam across the optical axis of a camera of the monitoring module.

21. Covering according to claim 20, wherein the at least one deflection device is arranged at the outside of an annular ring of the frontpane.

22. Covering according to claim 20, wherein at least one fixing device is arranged at least at the lateral surface of the cylindrical fixing surface.

\* \* \* \* \*